United States Patent
Lopez et al.

(10) Patent No.: US 7,208,110 B2
(45) Date of Patent: Apr. 24, 2007

(54) REGROOVABLE TREAD AND PROCESSES FOR OBTAINING SUCH

(75) Inventors: Jose Merino Lopez, Riom (FR); Julien Metzger, Clermont-Ferrand (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 119 days.

(21) Appl. No.: 10/698,369

(22) Filed: Nov. 3, 2003

(65) Prior Publication Data

US 2004/0089384 A1    May 13, 2004

Related U.S. Application Data

(63) Continuation of application No. PCT/EP02/04712, filed on Apr. 29, 2002.

(30) Foreign Application Priority Data

May 3, 2001    (FR)    ................... 01 05949

(51) Int. Cl.
  B29D 30/68    (2006.01)
  B60C 1/00    (2006.01)
  B60C 11/00    (2006.01)
  B60C 11/12    (2006.01)

(52) U.S. Cl. .............. 264/139; 152/209.5; 152/209.17; 152/209.18; 152/DIG. 3; 156/129; 157/13

(58) Field of Classification Search ............ 156/128.1, 156/129, 289, 293; 264/325, 139; 157/13; 152/154.2, 209.5, 209.17, 209.18, DIG. 3
See application file for complete search history.

(56) References Cited

U.S. PATENT DOCUMENTS

| | | | | |
|---|---|---|---|---|
| 1,876,016 A * | 9/1932 | Pederson | ................ | 152/209.5 |
| 2,148,343 A | 2/1939 | Flautt | | |
| 2,232,488 A * | 2/1941 | Smith | ................ | 156/293 |
| 2,246,479 A * | 6/1941 | Schrank | ................ | 152/DIG. 3 |
| 2,382,068 A * | 8/1945 | Kovacs | ................ | 157/13 |
| 2,960,138 A | 11/1960 | Chiodo | | |
| 3,578,055 A | 5/1971 | French | | |
| 5,247,983 A | 9/1993 | Inez | | |
| 5,603,366 A | 2/1997 | Nakayama et al. | | |
| 6,003,576 A | 12/1999 | Auxerre et al. | | |
| 6,408,910 B1 | 6/2002 | Lagnier et al. | | |
| 6,484,772 B1 * | 11/2002 | De Labareyre et al. | . | 152/209.17 |
| 6,591,881 B2 * | 7/2003 | Artrip | ................ | 152/209.17 |
| 2003/0047263 A1 * | 3/2003 | Lopez | ................ | 152/209.22 |

FOREIGN PATENT DOCUMENTS

DE    533 651 C    9/1931

(Continued)

Primary Examiner—Steven D. Maki
(74) Attorney, Agent, or Firm—Buchanan Ingersoll & Rooney PC

(57) ABSTRACT

A tread of thickness E, intended to be used in a tire having a carcass reinforcement surmounted by a crown reinforcement and including on its outer surface a plurality of grooves of depth h, including at least circumferential grooves separated axially by ribs, is provided with at least one internal, circumferential anti-rubber-on-rubber connection element, the outer wall of which, viewed in meridian section, has in part a contour identical to the contour of the wall of the regrooving groove to be created, the point(s) of said wall which are farthest from the axis of rotation being radially distant from the tread surface by a quantity $h_1$ less than the depth h of the grooves, and the point(s) of said wall closest to the axis of rotation being radially distant from the tread surface by the maximum regrooving height H.

20 Claims, 4 Drawing Sheets

| | FOREIGN PATENT DOCUMENTS | | | JP | 04 176709 A | | 10/1992 |
|----|----|----|----|----|----|----|----|
| | | | | JP | 11-78430 | * | 3/1999 |
| FR | 2 758 768 A | | 7/1998 | JP | 2001-39115 | * | 2/2001 |
| FR | 2 759 321 A | | 8/1998 | JP | 187516 A | | 7/2001 |
| FR | 2 763 892 A | | 12/1998 | WO | WO 98/35842 | * | 8/1998 |
| GB | 511271 | * | 8/1939 | WO | WO 98/54009 | * | 12/1998 |
| JP | 3-153406 | * | 7/1991 | | | | |
| JP | 4-113905 | * | 4/1992 | * cited by examiner | | | |

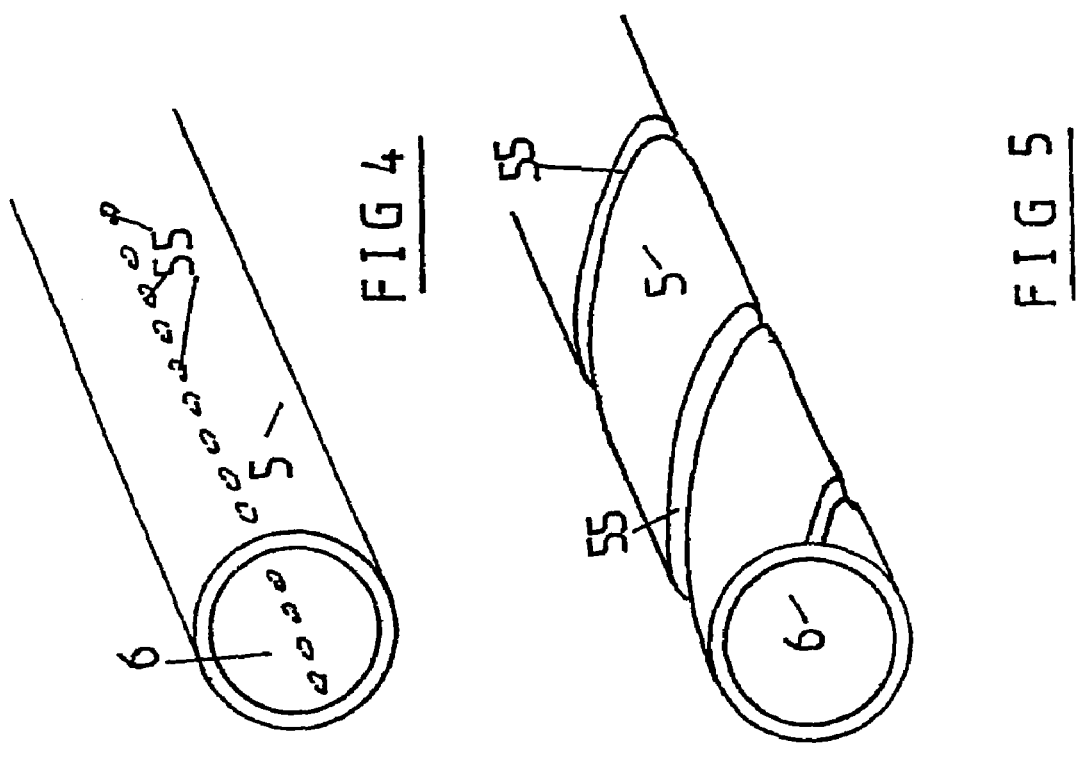
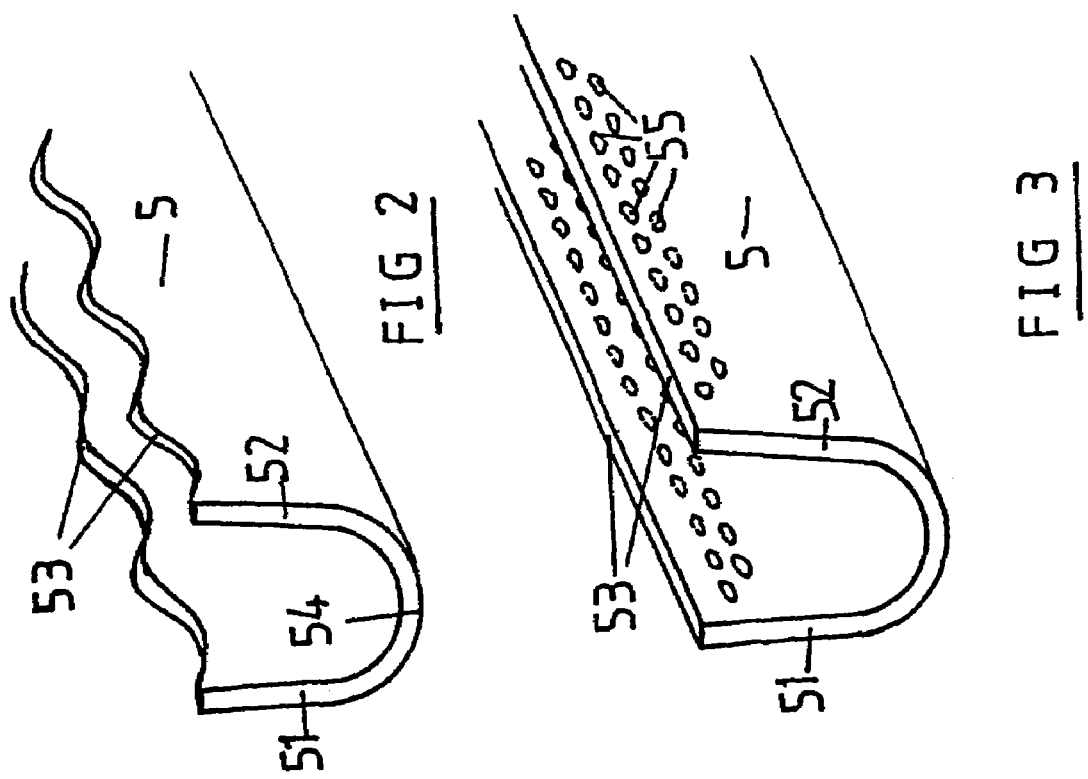

REGROOVABLE TREAD AND PROCESSES FOR OBTAINING SUCH

This application is a continuation of international PCT application Ser. No. PCT/EP02/04712, filed Apr. 29, 2002, which was published in English as WO 02/090094 A1 on Nov. 14, 2002, and which is incorporated by reference.

The invention relates to a tire, and more particularly to the tread of such a tire which is capable of being regrooved, whatever the characteristics of such a tread.

BACKGROUND

In the very great majority of cases, tread patterns for heavy-vehicle tires are provided with circumferential grooves, whether rectilinear, zigzag or undulating, said grooves possibly being joined by transverse grooves and/or incisions. The circumferential grooves generally comprise wear indicators, small underlayers of vulcanized rubber mix (or rubber) covering the bottom of these grooves over a certain circumferential length, said indicator indicating the minimum tread depth which must legally remain on the tread when in use. The tread patterns for heavy vehicles are regroovable (operation by means of which new grooves can be re-cut), and tires having such tread patterns bear the word "regroovable" or the symbol "U" on their sidewalls. Regrooving makes it possible firstly to extend the grip potential of the heavy-vehicle tire and secondly to increase substantially the possible mileage: from 15 to 30% depending on the case, without adversely affecting the possibility of recapping, which is furthermore an essential characteristic of a heavy-vehicle tire. It should be added that regrooving also makes it possible to save on fuel, since the tire has a lesser rolling resistance, owing to the reduced depth of the grooves in the initial state compared with those of a tire having, when new, an overall tread pattern depth corresponding to the maximum regrooving depth.

As is known per se, the regrooving of a groove can be effected using a heated rounded blade, frequently still manipulated by an operator. Said blade, which is connected to a frame which bears on the tread surface, may be used manually so as to follow the trace of the groove on the surface of the tread fairly faithfully, even in the case of a groove having a non-rectilinear trace. However, this regrooving operation requires a certain number of precautions. The first consists of effecting the regrooving operation when there is about 2 mm of groove depth remaining, said depth being measured between the tread surface and the radially outer surface of the wear indicators placed at the bottom of the groove. This precaution makes it possible to visualize the design of the tread pattern well and thus to reproduce it without major difficulty. Given the depth of tread pattern remaining and the regrooving depth recommended by the tire manufacturer, it is then possible to adjust and control the height of the regrooving blade.

The regrooving depths generally indicated are theoretical depths. Although they are satisfactory in a majority of cases, and make it possible theoretically to control the blade height to maintain approximately a certain thickness of rubber between the bottom of the regrooved groove and the radially upper face of the crown reinforcement, the risks of excessively deep regrooving are not ruled out. Now, excessive regrooving may cause damage causing premature destruction of the tire. It may also compromise the possibility of economic recapping, that is to say, recapping in which only the tread is changed. It may also, in some extreme cases, involve the appearance, at the bottom of the new grooves after regrooving, of the plies of the radially subjacent crown reinforcement, which is not generally accepted by current legislation.

In order to permit regrooving to be carried out which respects precisely the presence of a minimum thickness of rubber, above the radially outer face of the crown reinforcement, set by the tire manufacturer, while making it possible to increase as far as possible the possible mileage of the tire, U.S. Pat. No. 6,003,576 advocates, in a tire, comprising a radial carcass reinforcement radially surmounted by a crown reinforcement formed of at least one ply of reinforcement elements, and a tread provided with grooves which are capable of being regrooved, providing those parts of the tread which are located radially beneath the regroovable grooves with depth indicators, each indicator comprising at least one means indicating the minimum depth to be reached for effective regrooving and the maximum depth which must not be exceeded at any cost.

The depth indicators are preferably in the form of incisions of low width other than zero which are placed at the bottom of the groove either parallel to the direction of said groove or perpendicular to said direction, or both simultaneously, the means indicating the minimum and maximum depths then being the geometric form of the bottom of the depth-indicating incision.

Although they have resulted in great progress in terms of the art and manner of regrooving a tread, the regrooving indicators, despite extensive mechanization and robotisation, do not remove the risk of a cutting blade passing very close to the plies of the crown reinforcement; these indicators do not dispense with the need for a human presence for adjusting the depth. Furthermore, the regrooving is effected radially beneath the original grooves, which were designed as a function of the thickness of a new tread, and not as a function of a tread, the thickness of which has greatly decreased and the optimal tread pattern design of which is not necessarily the design thought up for the normal thickness of the tread.

It has also been proposed (U.S. Pat. No. 2,148,343) to incorporate in the tread of the new tire a plurality of filler arranged within said tread in the longitudinal direction. As soon as the wear of the tread reaches the fillers, the latter are ejected by centrifugal force and new grooves are then formed. This solution results in risks linked to the ejection of pieces of filler of greater or lesser size which when thrown off at high speed represent a potential risk to people or vehicles nearby; furthermore, these pieces pollute the environment.

SUMMARY OF INVENTION

In order to be freed as much as possible from all the drawbacks mentioned above, the invention proposes fixing the characteristics of regrooving, in particular of regrooving depth, in the tread when new.

Thus the tread of thickness E, according to the invention, intended to be used in a tire having a carcass reinforcement surmounted by a crown reinforcement, comprises on its outer running surface a plurality of grooves of depth h, including at least circumferential grooves separated axially by ribs; this tread is furthermore provided with at least one internal anti-rubber-on-rubber connection element, the outer wall of which, viewed in meridian section, has in part a contour identical to the contour of the wall of the regrooving groove to be created, the point(s) of said wall which are farthest from the axis of rotation being radially distant from the tread surface by a quantity $h_1$ less than the depth h of the grooves, and the point(s) of said wall which is(are) closest to the axis of rotation being radially distant from the tread surface by the maximum regrooving height H, this tread being characterized in that each anti-connection element defining a regrooving groove comprises a means providing a partial connection to its rubber surroundings which prevents ejection of material occupying said regrooving groove during travel when said anti-connection element opens on to the running surface after wear.

The means ensuring a partial connection of the anti-connection element to the rest of the tread may consist:

either in the form or the contour of the radially upper ends of the branches of the incisions or of the inserts arranged in the rubber mass; said contour being defined as a continuous line of variable height, said height being measured relative to the bottom of the anti-connection element (point of the outer wall of said element which is farthest from the surface of the tread), and being advantageously, because it is simple, representative of a periodic function (undulating, zigzag, crenellated contour or contour of equivalent form);

or in a plurality of orifices in the walls of an insert of solid material, which orifices permit the formation upon the molding and vulcanization of the tread of rubber bridges between the regrooving filler and the rest of the tread, each orifice having a surface area at most equal to 25 mm² and maximum dimensions of between 0.5 mm and 25 mm, or in at least one discontinuity of an incision or an insert, said discontinuity furthermore permitting, as above, the formation of rubber bridges between the regrooving filler and tread.

When the tire reaches a level of wear such that the radially outer wall of an anti-connection element opens on to the running surface, the portion of rubber inserted into the element or regrooving filler (for example, the material between the two branches of an anti-connection element) is retained by the partial connection means which avoid any violent throwing-off during travel. These same means are referred to as partial connection means since they are provided to make it possible, when the time comes, for an operator exerting a reasonable force to remove the regrooving filler, possibly without the aid of a specific tool.

Preferably, provision is made, in combination with the partial connection means of each anti-connection element, for a means indicating that the anti-connection element opens on to the running surface of the partially worn tread (that is to say at a level of wear such that the ends of said element which are radially closest to the running surface in the initial state come into contact with the roadway during travel). This means which makes the anti-connection element visible may be a material having a different color from the color of the tread in order to be clearly visible.

An anti-rubber-on-rubber connection element (a rubber being, as is known per se, a rubber mix comprising one or more elastomers, one or more reinforcing fillers, vulcanization products and also various additives) may exist in the following two forms:

a cutout or an incision the facing walls of which are spaced apart by a thickness which may be of between 0.2 mm and 2 mm, and separated by the atmosphere, an anti-sticking insert of thickness e or space of width e filled with a solid material having the property of being an anti-sticking means between rubbers and of not sticking itself to rubbers or of being very readily degradable or being able to be torn under low force, the quantity e possibly being virtually zero.

"Internal anti-connection element" is to be understood to mean an element which is completely inserted into the tread in question when new (the outer walls of this element are entirely contained within the tread) and not opening on to the running surface when new.

An anti-connection element, be it in the form of an incision or a space with anti-sticking material, has, viewed in section, outer walls which can be represented by a closed curve such as a circle, parallelogram etc., or by an open curve: the anti-connection element then having at least two branches of thickness e, which are preferably, but not necessarily, substantially parallel to the equatorial plane ("section of an anti-connection element" should be understood here to mean a section perpendicular to its largest dimension).

Those points of the outer wall of an element which are farthest from the axis of rotation are preferably distant from the tread surface in the initial state by a quantity $h_1$ such that the difference $(h-h_1)$ is at least equal to the standardized thickness of the wear indicators located in the bottom of the circumferential grooves.

In the case of an anti-connection element having at least two branches, the contours or forms of the branches, viewed in section, may be such that the bottom or base of said element, which joins the two branches radially to the inside, is either relatively narrow axially, or relatively wide axially. "Relatively narrow" is to be understood to mean a base the axial width of which is at most equal to 6 mm. Reciprocally, any axial width of the base greater than 6 mm imparts to said base the qualification "wide", the axial width of the bottom of an anti-connection element having two branches being the axial distance between the radially inner ends of said two branches. In the first case, that is to say the one having a narrow base, the branches may be independent of each other, that is to say, not connected together. In the second case (wide base), the radially inner ends of the branches are axially joined by a base of generally curved form, such as of circular or elliptical form, and the radially outer wall of which has a form identical to the bottom of a groove to be created by regrooving.

The anti-connection elements of a tread are generally circumferential, but they may also form a network so as to obtain not only the regrooving of circumferential grooves but also the regrooving of transverse and/or oblique grooves opening on to said circumferential grooves.

One object of the invention is also to propose one or more processes for obtaining a tread intended to be regrooved after wear down to the legal limit. One of the processes for obtaining a non-vulcanized tread, according to the invention, comprises the following steps:

a) producing a first profiled tread of non-vulcanized rubber mix provided with grooves corresponding to the regrooving grooves to be created when the time comes;

b) producing inserts with anti-sticking solid material, which inserts, when viewed in section, lie closely at least in part against the form(s) of the regrooving grooves, said inserts being either provided with orifices adapted in number, in dimensions and in location in order to obtain the desired distribution of the rubber bridges between the regrooving filler and the rest of the tread, or circumferentially discontinuous, or having radially upper ends of suitable form, c) inserting said inserts into the grooves of the first tread above, d) laying in said grooves provided with their inserts profiled regrooving fillers of non-vulcanized rubber mix, e) possible laying on the assembly thus constituted of a second tread of non-vulcanized rubber mix, with or without grooves.

The tire is finished in a manner well-known per se, that is to say with laying of the non-vulcanized tread on the non-vulcanized carcass blank, followed by the molding and vulcanization of the whole in a suitable mould.

Another advantageous process uses as anti-connection elements incisions of low thickness having, viewed in meridian section, the form of the walls of the grooves to be regrooved (the rubber located between said incisions forming a regrooving filler). The process according to the invention then consists of using a vulcanization mould having two dies, such as mentioned in patent EP 0858875, for obtaining the tread: a first die of said mould comprises as molding elements inter alia circumferential metallic lamellae capable of creating by molding and vulcanization the anti-connection elements, incisions, and a second die comprising the molding elements intended to form the grooves and/or the incisions of that part of the tread when new which is intended to come into contact with the ground. The metallic lamellae molding the anti-connection elements may have at their ends forms which are undulating, in a zigzag, crenellated or equivalent. They may also be circumferentially discontinuous in part or completely.

The closure of the mould having two dies and the vulcanization which follows makes it possible to obtain a vulcanized tread comprising radially to the inside among other elements the anti-sticking elements, the incisions thus formed, and radially to the outside the tread pattern of the new tread. The tire is then built in the following manner, be it a new tire or a recapped tire: after laying a layer of non-vulcanized rubber mix on the carcass blank, which layer has a thickness which corresponds to the thickness required above the last crown ply, the pre-vulcanized tread obtained above is laid.

The method of regrooving proper of the tread after maximum wear (maximum wear being the wear achieved when one or more wear indicators is/are in contact with the covering of the ground) is then very simplified and such that the manufacturing dispersions, in particular in the thicknesses of the product, and manual human intervention in no way adversely affect the radial location of the bottoms of regrooving grooves. This regrooving method consists, after the radially outer walls or ends of at least one anti-connection element are visible at least in part, of cutting out a small number of bridges of vulcanized rubber connecting each regrooving filler to the rest of the tread, then extracting each filler from the tread by breaking the rest of the bridges of vulcanized rubber connecting said filler to form a new groove by traction or shearing.

BRIEF DESCRIPTION OF THE DRAWINGS

The characteristics of the invention will be better understood with reference to the description of examples of embodiment described in non-limitative manner, and illustrated by the attached drawings, in which:

FIGS. 2 to 5 are perspective views of inserts intended for molding regrooving grooves, in four variants according to the invention.

DETAILED DESCRIPTION

Figure 1:
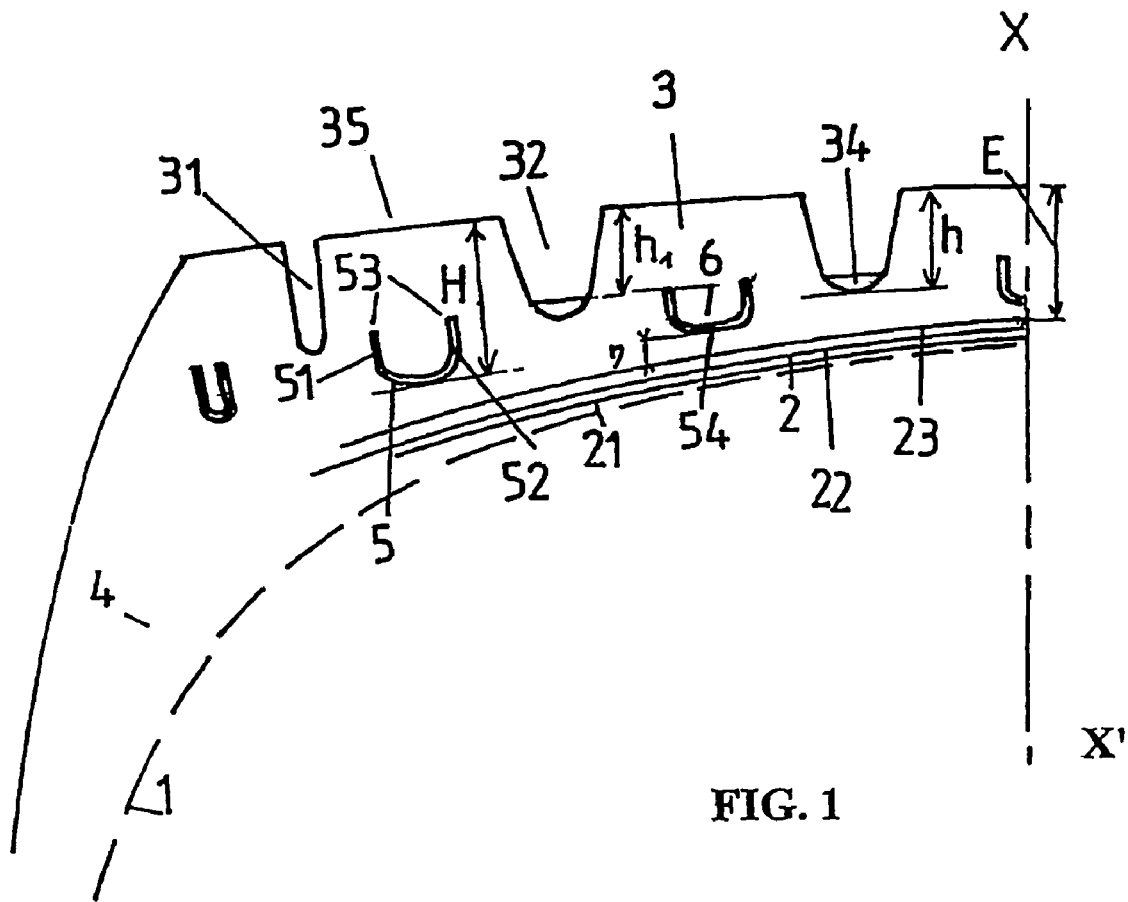
FIG. 1 represents diagrammatically, in meridian section, a tire tread of 'heavy vehicle' type according to the invention.

The tire P which is shown in FIG. 1 is of 'heavy vehicle' type and of dimension 315/80-R 22.5; it comprises a carcass reinforcement 1 comprising, in the example described, a single ply of metallic reinforcement elements, said carcass reinforcement being anchored within each bead to a bead wire by winding, forming axially outer upturns (not shown). The carcass reinforcement 1 is radially surmounted by a crown reinforcement 2, consisting of at least two working crown plies 21 and 22 of inextensible metal cables, which are parallel to each other within each ply and are crossed from one ply to the next, forming angles generally of between 0 and 45° with the circumferential direction, these working plies 21, 22 being surmounted radially by what is called a protective ply 23 formed of what are called "elastic" metal cables.

A tread 3, of thickness E, measured in the equatorial plane XX' between the tread surface and the radially outer surface of the radially outermost crown ply 23, covers the crown reinforcement 2 and is joined to the two beads of the tire by sidewalls 4. This tread 3 comprises grooves 32 which are said to be wide compared with the grooves 31 of the edges, which are said to be narrow. The grooves 31 and 32 are the conventional grooves found on any tire when new which open on to the contact surface between the tire and the ground. The grooves 32 of depth h, measured between the surface 35 of the tread 3 and the bottom of the groove, are provided with protuberances which act as wear indicators 34, the radially outer face of which protuberances is distant from the tread surface by a depth $h_1$ less than the depth h and which, when they come into contact with the ground during travel, indicate that it is advisable to carry out the regrooving operation.

In accordance with the invention, the regrooving operation is greatly facilitated by the presence, within the tread 3, of circumferential anti-rubber-on-rubber connection elements 5, which elements, in section, in the example described, are in a U-shape. Each of these elements 5, which cannot be vulcanized and are for example made of cardboard or paper of low thickness, prevents axially, during the vulcanization of the tread, any partial or total contact between the portion 6 (or regrooving filler 6) of rubber mix located between the two branches 51 and 52 of said element 5 and the adjoining parts of rubber mix.

The radially outer ends 53 of the branches 51 and 52 are distant from the surface 35 of the tread 5 by the quantity $h_1$, whereas the radially inner end is distant from the surface 35 by the quantity H, less than the thickness E of the tread 3 measured at the same axial position as that where H is measured. The radially inner ends are interconnected by the common part 54. The thickness of a tread is in fact axially variable as a function of the respective curvatures of the running surface of the tread and of the crown reinforcement and the same applies for the quantity H, imposed by the tire manufacturer as a function of the minimum thickness n of rubber mix necessary radially above the radially outermost crown ply 23.

So that the filler 6 of vulcanized rubber mix cannot be ejected from the tread under the action of centrifugal force during travel when the wear of the tread reaches the radially outer ends 53 of the branches 51 and 52 of the anti-connection elements 5 it is advantageous for there to be a partial connection between the filler 6 and the rest of the tread 3. To this end, and as shown for example in FIG. 2, the trace (that is to say the contour or the geometric form) of the radially outer ends 53 is preferably representative of what is called a periodic function: the ends may form recesses such as by having a shape that is undulating (FIG. 2), or provided with notches of rectangular form (FIG. 6) or of triangular or semi-circular form (not shown). When the wear of the tread 3 is such that the wear indicators 34 are in contact with the ground, the parts of the ends 53, radially closest to the surface of the tread 3, of the insert 5 appear on the running surface, while bridges of vulcanized rubber remain that form retaining portions which are at a location radially inwardly of a radially outermost portion of the anti-connection element and radially outwardly of a common interconnecting part 54 to hold the filler 6 in place at least for a certain time. These rubber bridges are capable of being broken by a person who wishes to recreate new grooves by removing the filler 6 relatively easily.

The partial connection between the rubber of the filler 6 and the rest of the tread can also be effected on the branches 51 and 52. As shown in FIG. 3, the branches 51 and 52 of the insert, formed of the same material as previously, are provided with recesses in the form of orifices of closed contour 55 in their upper part (that is to say close to the running surface in the initial state) which make it possible for rubber mix to pass through during the molding of the tread to connect the tread and the regrooving filler 6, and thus to create a retaining portion in the form of bridges of vulcanized rubber at locations radially inwardly of the radially outermost portion of the anti-connection element and radially outwardly of the common part, which bridges will then be broken by cutting and/or by traction at the time of the regrooving operation.

It is possible to use other variants: if the form of a U shown in FIGS. 2 and 3 is referred to as an open surface, the circular form of FIG. 4 is a form having a closed surface (circular form in the case). The insert 5 internally encloses the regrooving filler 6 of rubber mix and is provided with recesses in the form of orifices 55 passing through said closed surface to create bridges of rubber between said filler and the rest of the tread at the time of molding of the tread.

As recesses for forming connecting bridges between the tread and the regrooving fillers, there may be used orifices having a closed contour or orifices 55 having an open contour or slots (see for example FIG. 7), or a recess in the form of a slot 55 having a helicoidal trace on the outer surface of the circumferential regrooving filler 6, said slot 55 being obtained by helicoidal winding of a strip of an insert 5 around a rubber filler 6, the winding pitch being appropriate so that the various turns are not adjoining, as shown in FIG. 5.

Whether the orifices have closed contours or open ones, the total connection surface between the anti-connection element (insert or incision) and the tread, referred to as bridging surface, is of between 5% and 35% of the total outer surface of said anti-connection element so as to make the separation of the filler from the tread at the time of regrooving easy by intervention of an operator while preventing this separation from taking place spontaneously. This low value of bridging surface furthermore ensures sufficiently precise cutting-out of the filler.

The use of inserts of paper, cardboard or of other material having the properties of being an anti-rubber-on-rubber sticking means and of not sticking itself to a rubber or tearing is the preferred solution when the manufacture of the tread with anti-connection elements is effected in the non-vulcanized state.

Figure 6:
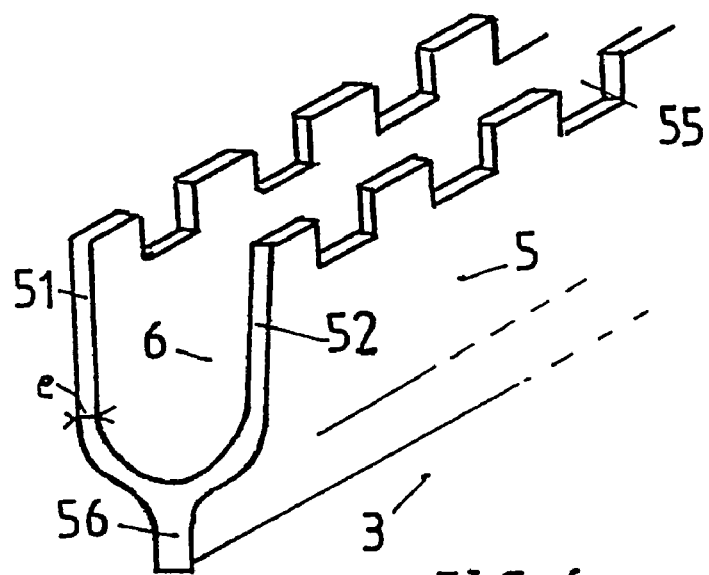
FIGS. 6 to 8 are views of incisions internal to the tread, in three variants according to the invention.
Figure 7:
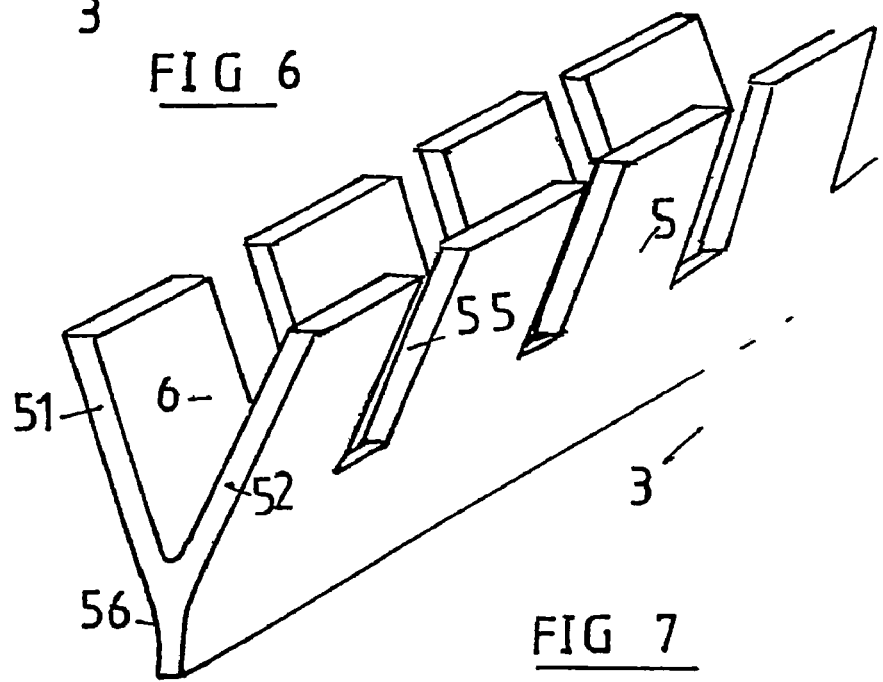

The tread may also be produced in the pre-vulcanized state in a mould having the special feature of having two dies, each die comprising metallic molding elements which will give rise to grooves in the tread. It is then particularly advantageous to use as anti-connection elements incisions of low thickness e, less than 1 mm (generally 0.5 mm). As shown in FIGS. 6 and 7, these U-shaped or V-shaped incisions have the special feature of having two branches 51 and 52 joined at their base by a common part 56, which part is the necessary consequence of demoulding the tread, the incision 5 being created in the vulcanization mould for the tread by a metallic lamella of the same shape and the part 56 enabling attachment to the wall of the mould. It is obvious that the above embodiment does not allow, for the presence of closed orifices on the lateral branches 51 and 52 of the incisions (the rubber bridges would be cut during demoulding), the only way of creating bridges between the rubber of the filler 6 and the rest of the trade being the form of the ends 53 of the branches. FIGS. 6 and 7 show crenellated forms with a difference in the dimensions of the bridges, the bridging surface remaining substantially constant: FIG. 6 uses crenellations of low height, whereas the crenellations or slots 55 shown in FIG. 7 are deeper but less wide.

Figure 8:
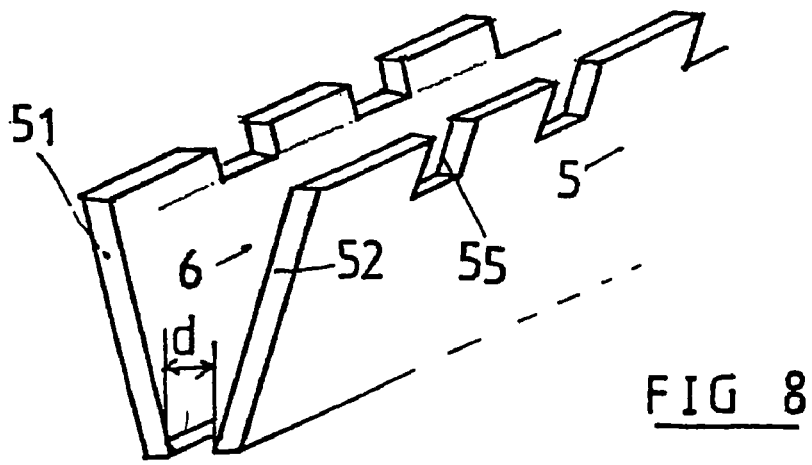

FIG. 8 shows an incision which may be considered as a variant of the incision of FIG. 7: the virtual V-shape is retained, but the point of the V is truncated such that there are two branches 51 and 52 independent of each other, the radially inner ends of which are distant from each other by a small amount d, of the order of 3 mm. Said distance d of connection by bonding between the rubber of the regrooving filler 6 and the rubber of the rest of the tread 3 multiplied by the circumferential length of the filler 6 is sufficient to hold the filler after appearance on the running surface of the branches 51 and 52 of the incision 5, the crenellated radially outer ends of the branches 51 and 52 serving here to indicate that the wear of the tread is such that the regrooving operation has become necessary.

Figure 9:
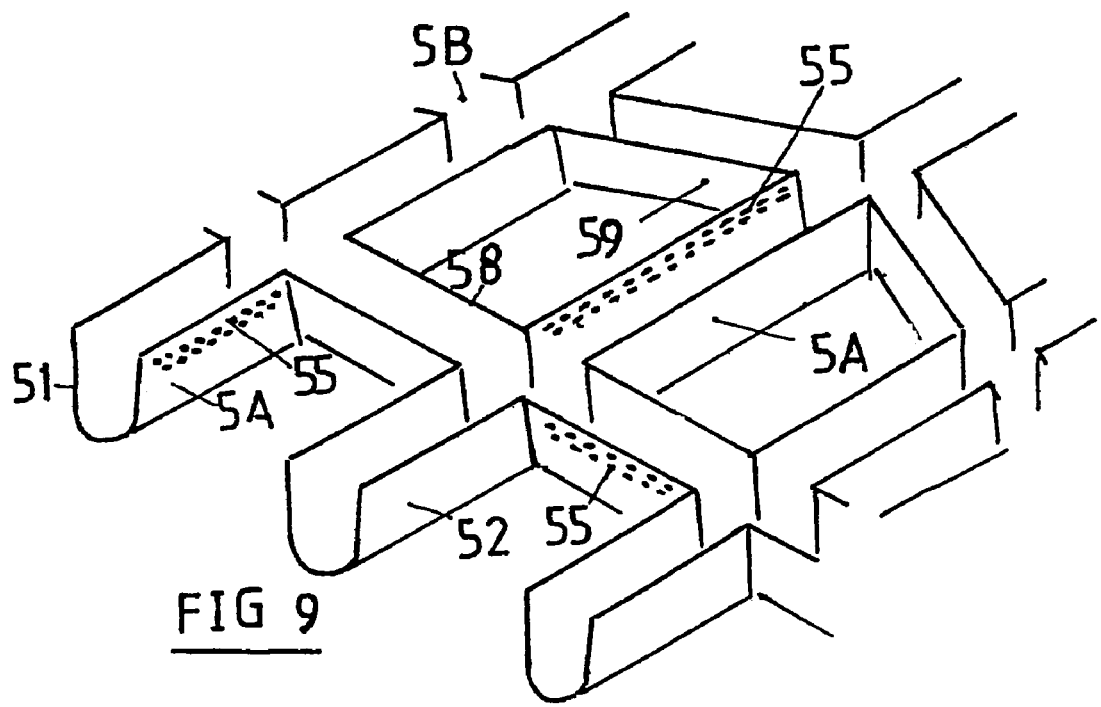
FIG. 9 shows diagrammatically a network of inserts internal to the tread.

As FIG. 9 shows, it is also possible to create a network of anti-connection elements with circumferential parts 5A and transverse parts 5B, the respective walls 51, 52 and 58, 59 of which are provided with closed orifices or holes 55 for creating rubber bridges between the regrooving fillers 6A and 6B and the rest of the tread 3. The creation of such a network, in the context of regrooving, makes it possible to provide the tread with a tread pattern design more appropriate to the thickness of the tread after wear, which tread pattern makes the tread more deformable in the three main directions, and particularly in the longitudinal direction.

Figure 10:
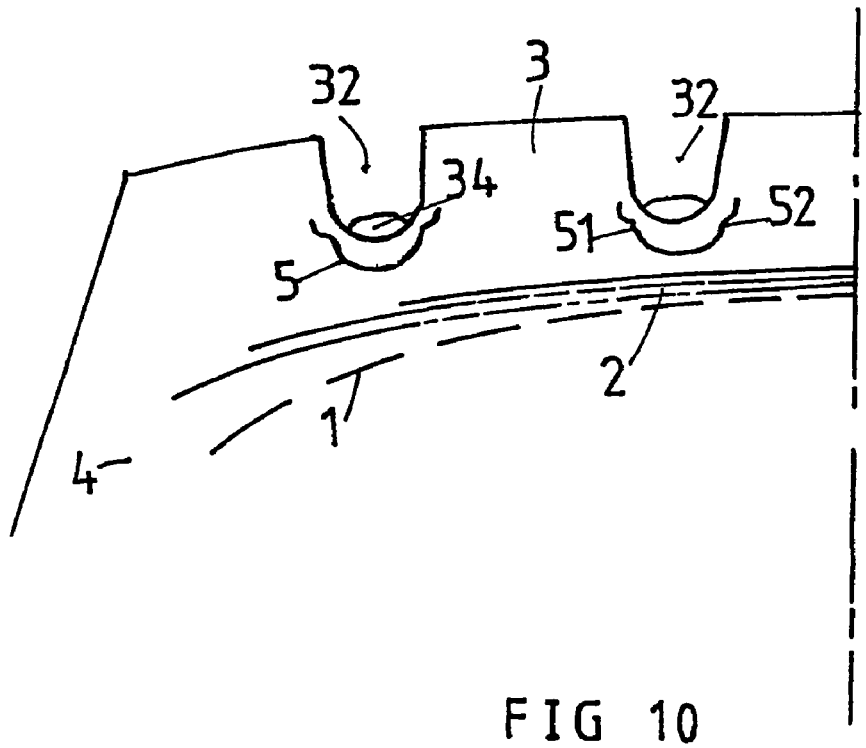
FIG. 10 shows diagrammatically another arrangement of the anti-connection elements in a tread.

The regrooving of the tread 3 may also be effected with a substantially constant tread pattern design: as shown in FIG. 10, it is sufficient to arrange the inserts or to provide for the positioning of the incisions radially beneath the original circumferential grooves of the tread, said inserts or incisions having, viewed in meridian section, a suitable shape which is more widened at their radially outer parts and the other characteristics of the anti-connection elements being the same as previously.

Figure 11:
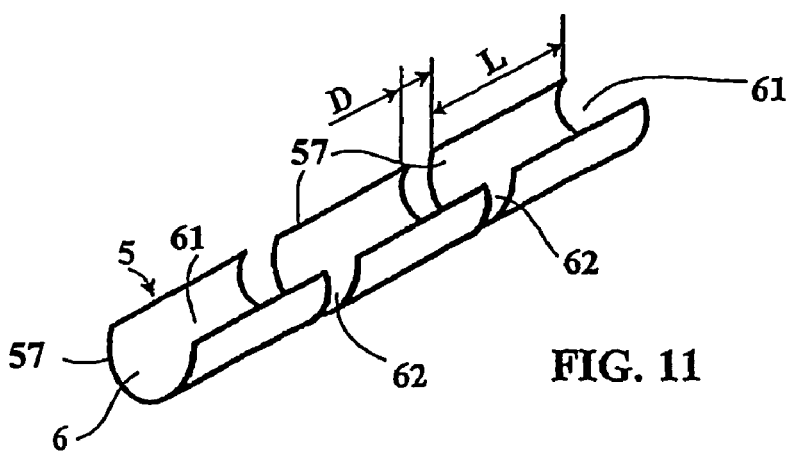
FIG. 11 shows a variant embodiment implementing a discontinuous anti-connection element.

FIG. 11 shows an anti-connection element 5 intended to be incorporated inside a tread in the circumferential direction, this anti-connection element 5 being composed of a plurality of circumferentially separated element sections 57 which are completely disconnected from each other and each having a section in an open U-shape. These disconnected sections 57 of average length L are arranged following one another so as to define a regrooving filler corresponding to the rubber 61 located within said elements and to the rubber 62 between two disconnected sections 57. The average distance D between each disconnected element 57 is less than their length L (preferably, the distance D is between 5% and 35% of the length L). Between two disconnected sections 57 the rubber of the filler is connected to the rest of the tread at a location radially inwardly of the radially outermost portion of the anti-connection element, which ensures the connection of the filler to the tread. Once the moment of regrooving has arrived, it is easy for an operator to break the rubber bridges 62 to form a new groove at the location of the filler. Another variant may consist of providing for the branches of an anti-connection element not to be of the same length (that is to say that one branch is closer to the running surface than the other branch of the same element).

The invention claimed is:

1. A tire including a tread and a carcass reinforcement surmounted by a crown reinforcement, the tread provided on its running surface with a plurality of tread grooves of depth h; the grooves including at least circumferential grooves separated axially by ribs; the tread comprising at least one internal anti-rubber-on-rubber connection element comprising two branch portions each having radially inner and outer ends and a common part interconnecting the radially inner ends; the two branch portions forming, together with the common part, a space which delimits a volume of filler material occupying said space; said filler material being removable from said space for creating a regrooving groove; said at least one anti-connection element, when viewed in a meridian section, having in part a contour identical to the contour of a wall of the regrooving groove; the radially outermost portion of said at least one anti-connection element located farthest from the tire's axis of rotation being spaced from the running surface by a distance h1 which is less than the depth h of the grooves; the radially innermost portion of said at least one anti-connection element located closest to the axis of rotation being spaced from the running surface by a maximum regrooving height H; wherein said at least one anti-connection element includes a recess arrangement formed therein which enables rubber of said tread to form a retaining portion connected to the filler material at a location radially inwardly of the radially outermost portion of the anti-connection element and radially outwardly of the common part; the recess arrangement positioned such that during tire travel when said radially outermost ends of said branch portions open on to the running surface after tread wear to expose the space, said retaining portion resists radial forces tending to eject said filler material from said space.

2. The tire according to claim 1 wherein the at least one anti-connection element includes a wall having a thickness in the range of 0.2 to 2 mm.

3. The tire according to claim 1 wherein the at least one anti-connection element has an anti-sticking property relative to both the tread rubber and the filler material.

4. The tire according to claim 3 wherein the at least one anti-connection element comprises solid material.

5. The tire according to claim 1 wherein the at least one anti-connection element comprises a one-piece solid insert.

6. The tire according to claim 1 wherein the at least one anti-connection element is formed of a tearable material.

7. The tire according to claim 1 wherein the two branches are arranged substantially parallel to an equatorial plane of the tire.

8. The tire according to claim 1 wherein the distance $(h-h_1)$ is at least equal to a thickness of a wear indicator located in the bottom of each circumferential groove of the tread.

9. The tire according to claim 1 wherein radially outer ends of the branches have respective contours in the form of circumferentially continuous lines of varying height, measured in a radial direction to define the recess arrangement.

10. The tire according to claim 9 wherein the contours are representative of a periodic function.

11. The tire according to claim 1 wherein the at least one anti-connection element comprises apertures formed through each branch portion at respective locations spaced radially inwardly from the branch portion's radially outer end.

12. The tire according to claim 1 wherein the anti-connection element and the filler material define a radially outer circumferential surface when the radially outermost portion of the at least one anti-connection element opens on to the running surface after tread wear, wherein there is a plurality of the retaining portions in the form of bridges spaced circumferentially apart along such outer surface; each bridge defining a radially outer bridging surface, wherein a total area of said bridging surfaces is in the range of 5% to 35% of the area of the outer circumferential surface defined by the anti-connection element and the filler material.

13. The tire according to claim 1 wherein the at least one anti-connection element comprises a plurality of anti-connection elements extending respectively in a circumferential direction of the tire and a plurality of anti-connection elements extending in a direction transversely of the circumferential direction.

14. The tire according to claim 1 wherein the at least one anti-connection element includes an indicator for indicating when the at least one anti-connection element has come into contact with a roadway after tread wear.

15. The tire according to claim 14 wherein the indicator comprises a coloration of the at least one anti-connection element which is different from a coloration of the tread.

16. A method of regrooving a tread according to claim 1 wherein after visualization of the radially outer ends of the branch portions following tread wear, the retaining portion is cut-out and the filler material is removed.

17. A tire including a tread and a carcass reinforcement surmounted by a crown reinforcement, the tread provided on its running surface with a plurality of tread grooves of depth h; the grooves including at least circumferential grooves separated axially by ribs; the tread comprising at least one internal anti-rubber-on-rubber connection element comprising two branch portions each having radially inner and outer ends and a common part interconnecting the radially inner ends, the two branch portions separated axially and forming, together with the common part, a space which delimits a volume of filler material occupying said space; said filler material being removable from said space for creating a regrooving groove; said at least one anti-connection element, when viewed in a meridian section, having in part a contour identical to the contour of a wall of the regrooving groove; the radially outermost portion of said at least one anti-connection element located farthest from the tire's axis of rotation being spaced from the running surface by a distance h1 which is less than the depth h of the grooves; the radially innermost portion of said at least one anti-connection element located closest to the axis of rotation being spaced from the running surface by a maximum regrooving height H; wherein said at least one anti-connection element includes circumferentially separated sections which enables rubber of said tread to form a retaining portion circumferentially between the sections and at a location radially inwardly of the radially outermost portion of said at least one anti-connection element; the recess arrangement positioned such that during tire travel when said radially outermost ends of said branch portions open on to the running surface after tread wear to expose the space, said retaining portion resists radial forces tending to eject said filler material from said space.

18. The tire according to claim 17 wherein the anti-connection element is of U-shaped cross section.

19. The tire according to claim 17 wherein the anti-connection element is of V-shaped cross section.

20. A method of regrooving a tread according to claim 17 wherein after visualization of the radially outer ends of the branch portions following tread wear, the retaining portion is cut-out and the filler material removed.

* * * * *